R. G. DAYTON.
Improvement in Potato Diggers.
No. 124,726.  Patented March 19, 1872.
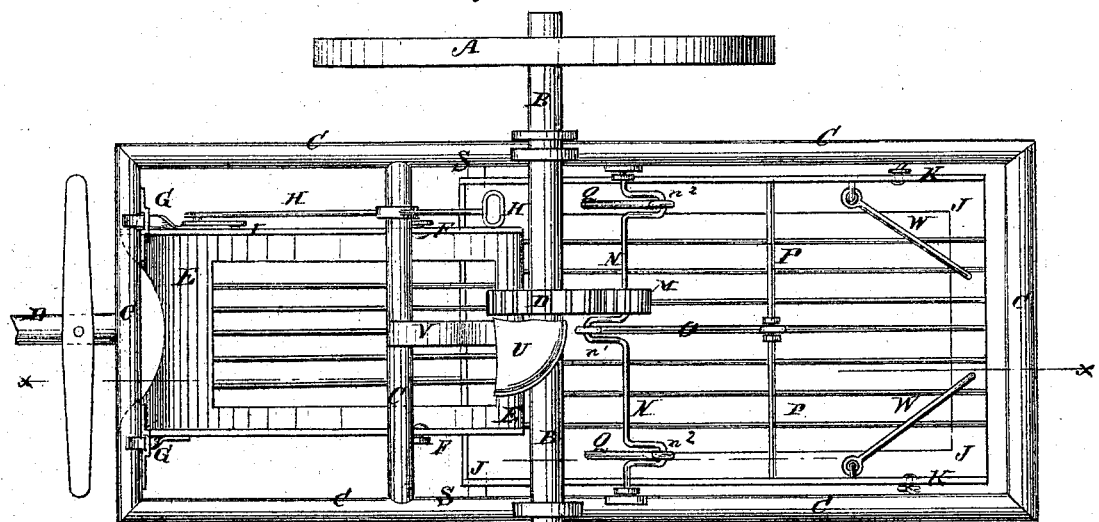
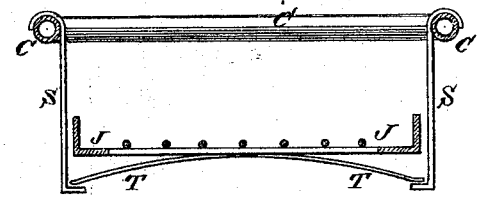
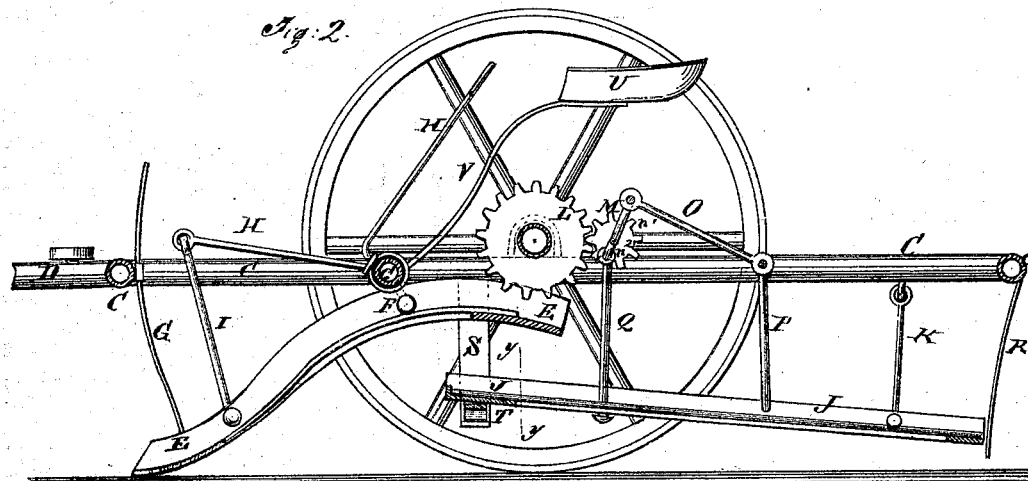
Witnesses:  
Chas. Nida  
Geo. W. Mabee
Inventor:  
R. G. Dayton  
PER  
Attorneys.

UNITED STATES PATENT OFFICE.

ROBERT G. DAYTON, OF NORTH GRANVILLE, NEW YORK.

IMPROVEMENT IN POTATO-DIGGERS.

Specification forming part of Letters Patent No. 124,726, dated March 19, 1872.

Specification describing a new and useful Improvement in Potato-Diggers, invented by ROBERT G. DAYTON, of North Granville, in the county of Washington and State of New York.

Figure 1 is a top view of my improved machine, part of the seat being broken away. Fig. 2 is a detail longitudinal section of the same taken through the line $x\,x$, Fig. 1. Fig. 3 is a detail cross-section taken through the line $y\,y$, Fig. 2.

Similar letters of reference indicate corresponding parts.

My invention has for its object to furnish an improved machine for digging potatoes, which shall be simple in construction, convenient in use, and effective in operation, raising the potatoes, separating them from the soil raised with them, and leaving them upon the surface of the ground; and it consists in the construction and combination of various parts, as hereinafter more fully described.

A are the wheels, one or both of which are so connected with the axle B as to carry it with them in their revolution. C is the frame of the machine, which is securely attached to the axle B, and to its forward end is attached the tongue D. E is the plow or scoop, the forward edge of which is concaved, as shown in Fig. 1, so as to tend to gather the potatoes toward the middle part of the scoop. The middle rear part of the scoop E is slotted, or is cut away and replaced with rods or slots, as shown in Fig. 1, to allow the loose earth raised with the potatoes to fall through to the ground while the potatoes pass back to the shaker. The scoop E is supported and the draft strain upon it is sustained by the rods F, the lower ends of which are pivoted to the rear part of the side flanges of the said scoop E. The upper ends of the rods F are attached to the cross-bar of the frame C. To the forward part of the side flanges of the scoop E are attached the lower ends of the rods G, which pass up through guides or keepers attached to the front cross-bar of the frame A, so as to guide the forward end of the scoop and keep it in proper position in its up-and-down movements. H is a lever which is pivoted to a cross-bar of the frame C, and the rear end of which projects upward and rearward into such a position that it can be conveniently reached and operated by the driver from his seat. The other end of the lever H projects forward, and to it is pivoted the upper end of the rod or rods I, the lower end or ends of which are attached to the side flange or flanges of the forward part of the scoop E. By this construction the driver by operating the lever H can adjust the scoop in the ground, or raise it entirely out of the ground when required. The downward movement of the forward end of the scoop E may be limited and the downward strain upon it sustained by pins passed through the guide-bars G above the cross-bar of the frame C. J is the shaker, which is slotted longitudinally, or is formed by attaching rods or bars to the front and rear cross-bars of a rectangular frame. To the rear part of the side flanges of the shaker J are pivoted the lower ends of two rods, K, the upper ends of which are pivoted to the rear parts of the side bars of the frame C, as shown in Figs. 1 and 2. To the axle B is attached a gear-wheel, L, into the teeth of which mesh the teeth of the gear-wheel M attached to the shaft N, which revolves in bearings attached to the frame C. Upon the middle part of the shaft N is formed a crank, $n^1$, to which is pivoted the forward end of the connecting-rod O, the rear end of which is pivoted to the upper or horizontal part of the rod P, the ends of which are bent downward, and are rigidly attached to the side bars of the shaker J. By this construction, as the machine is drawn forward, the crank $n^1$ will give the shaker a backward and forward movement. Upon the end parts of the shaft N are formed cranks $n^2$, to which are pivoted the upper ends of the rods Q, the lower ends of which are pivoted to the forward part of the side bars of the shaker J. By this construction, as the machine is drawn forward, the cranks $n^2$ will give an upward and downward movement to the forward end of the shaker J, which movement, in connection with the backward and forward movement given by the crank $n^1$, will shake off all the dirt that may adhere to potatoes, or may pass over with them from the scoop E, the dirt falling down through the shaker and the potatoes passing back and falling to the ground from the rear end of the said shaker. R are two spring-bars, the upper ends of which are attached to the rear cross-bar of the frame C. The spring-bars R project downward, so that the rear end of the shaker J, at the end of its rearward movement, may strike their lower ends and receive a sudden forward impulse to assist in shaking off the dirt. S are two bars, the upper ends of which are attached to the side bars of the frame C to serve as guides to the forward end of the shaker J in its up-and-down movement, and the lower ends of which are bent inward to receive the forward end of the said shaker at the end of its downward movement. If desired, a spring, T, may be attached to the lower ends of the bars S to receive the forward end of the shaker J at the end of its downward movement, and by its recoil give the shaker a sudden upward impulse, and thus assist in shaking off the dirt. U is the driver's seat, which is attached to the upper end of a spring-bar, V, the lower end of which is attached to a cross-bar of the frame C. W are rods, one or two of which may be used. In the forward ends of the rods W are formed eyes which are hooked upon hooks or pins attached to the side bars of the shaker J. Upon the rear ends of the rods W are formed hooks which are hooked into the rear end bar of the shaker J. The bar or bars W are intended to serve as guides to the potatoes to cause them to fall from one or the other side, or from the middle part of the rear end of the shaker J, as may be desired.

Having thus described my invention, I claim as new and desire to secure by Letters Patent—

1. The gear-wheels L M, crank-shaft N $n^1$ $n^2$, connecting-rod O P, rods Q, and pivot-rods K, all arranged in connection with the frame C and shaker J, as shown and described, whereby said shaker is operated as specified.

2. The combination of the spring-bars R and guide-bars S with the frame C and shaker J, substantially as herein shown and described, and for the purpose set forth, and whether the spring T be used or not.

ROBERT G. DAYTON.

Witnesses:
JAMES T. GRAHAM,
ALEX. F. ROBERTS.